(12) United States Patent
Yanada et al.

(10) Patent No.: US 6,898,361 B2
(45) Date of Patent: May 24, 2005

(54) DISPERSION-COMPENSATING OPTICAL FIBER AND OPTICAL TRANSMISSION LINE

(75) Inventors: Eiji Yanada, Yokohama (JP); Masaaki Hirano, Yokohama (JP); Masashi Onishi, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 206 days.

(21) Appl. No.: 10/374,716

(22) Filed: Feb. 27, 2003

(65) Prior Publication Data

US 2004/0005129 A1 Jan. 8, 2004

Related U.S. Application Data

(60) Provisional application No. 60/393,131, filed on Jul. 3, 2002.

(51) Int. Cl.[7] .................................................. G02B 6/16
(52) U.S. Cl. ...................................... 385/123; 385/128
(58) Field of Search ................................ 385/123–128, 385/141–142

(56) References Cited

U.S. PATENT DOCUMENTS 6,778,748 B2 * 8/2004 Sugizaki et al. ............ 385/123

2002/0168160 A1 * 11/2002 Hirano et al. ............... 385/123

FOREIGN PATENT DOCUMENTS

JP      2002-062450     2/2002

OTHER PUBLICATIONS

"Definitions and test methods for linear, deterministic attributes of single-mode fibre and cable", International Telecommunication Union, ITU-T Recommendation G.650.1, Jun. 2002, pp. 30–31.

* cited by examiner

Primary Examiner—John D. Lee
Assistant Examiner—Sarah Song
(74) Attorney, Agent, or Firm—McDermott Will & Emery LLP

(57) ABSTRACT

There is disclosed a dispersion-compensating optical fiber exhibiting, at a wavelength of 1500 nm, a chromatic dispersion of −30 ps/nm/km or less, a ratio (S/D) of −0.08/nm to +0.05/nm between chromatic dispersion D and dispersion slope S, a polarization mode dispersion of 0.3 ps/km$^{1/2}$ or less, and a transmission loss of 1 dB/km or less, and an excess loss of 0.2 dB/km or less due to OH group in a wavelength band of 1.4 μm.

12 Claims, 10 Drawing Sheets

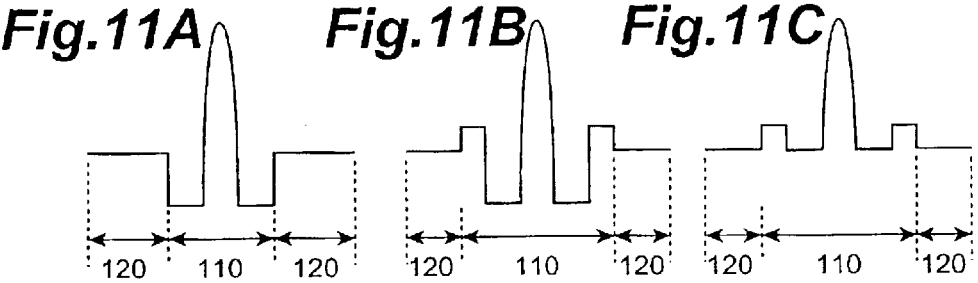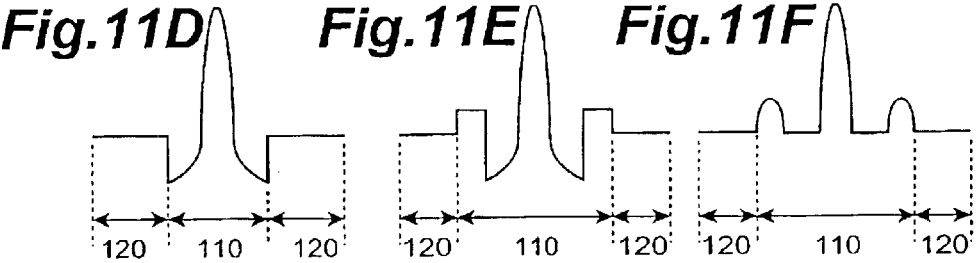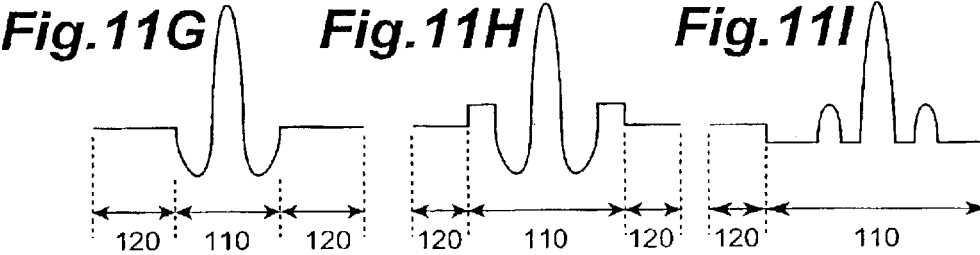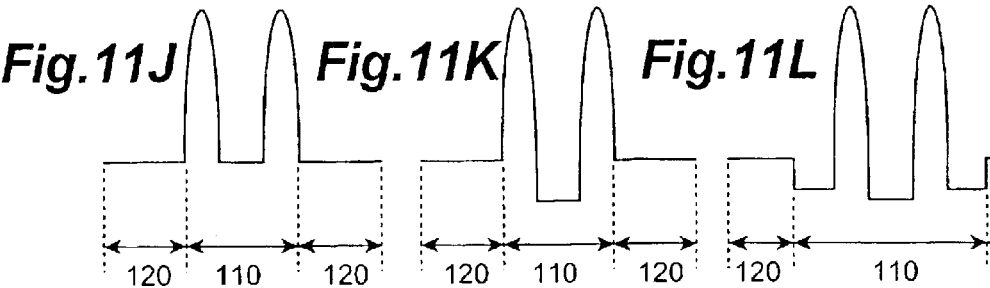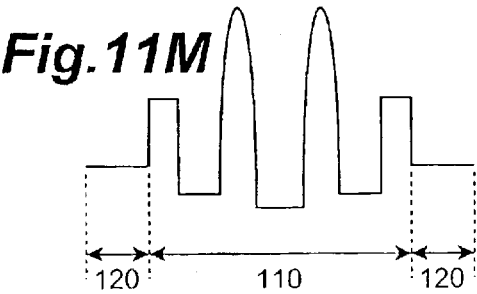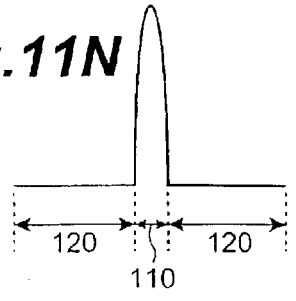

DISPERSION-COMPENSATING OPTICAL FIBER AND OPTICAL TRANSMISSION LINE

CROSS-REFERENCE TO RELATED APPLICATION

This application claims priority to Provisional Application Ser. No. 60/393,131 filed Jul. 3, 2002, which is/are hereby incorporated by reference in its/their entirety.

FIELD OF THE INVENTION

The present invention relates to an optical transmission line suitable for transmitting signal in a wavelength band of 1.5 μm, and a dispersion-compensating optical fiber suitably used as a part of the optical transmission line.

RELATED BACKGROUND ART

A wavelength division multiplexing (WDM) optical transmission system optically transmits a plurality of wavelengths of signal light by using a single optical transmission line, thereby being able to transmit a large volume of information. The WDM optical transmission line system has been required to have a larger volume, whereby the use of not only C band (1.55-μm wavelength band) and L band (1.59-μm wavelength band) but also S band (1.50-μm wavelength band) has been under consideration.

Meanwhile, an Er-doped optical fiber amplifier (EDFA: Erbium-Doped Fiber Amplifier) using an optical fiber having an optical waveguide region doped with Er element can optically amplify signal light in C band or L band with a high efficiency. Therefore, the signal light in C band or L band can optically be amplified by an EDFA provided within a repeater, so as to be transmitted over a long distance. On the other hand, the EDFA cannot optically amplify signal light in S band. By contrast, a Raman amplifier supplies an optical transmission line with Raman amplification pumping light having a wavelength appropriately selected according to the wavelength of signal light, thereby Raman-amplifying signal light propagating through the optical transmission line, whereas the signal light to be Raman-amplified may have any wavelength. Therefore, while the signal light in C and L bands is optically amplified by the EDFA, the signal light in S band may be optically amplified by the Raman amplifier.

For attaining a larger volume, it is desirable that both of the absolute value of chromatic dispersion and the absolute value of dispersion slope in the signal light wavelength band be smaller in an optical transmission line. However, an optical transmission line in which the respective absolute values of chromatic dispersion and dispersion slope are smaller is hard to be constructed by a single kind of optical fiber alone. Therefore, in general, two or more kinds of optical fibers (e.g., a transmission optical fiber and a dispersion-compensating optical fiber for compensating for the chromatic dispersion of this transmission optical fiber) having respective chromatic dispersion characteristics different from each other are connected to each other, so as to construct an optical transmission line in which each of the respective absolute values of chromatic dispersion and dispersion slope in the whole optical transmission line is small.

For Raman-amplifying the signal light in S band, the Raman amplification pumping light is required to have a wavelength falling within the band of 1.4 μm. However, the dispersion-compensating optical fiber used for compensating for the chromatic dispersion of the transmission optical fiber has an excess loss caused by OH group in the 1.4-μm wavelength band. Therefore, the Raman amplification pumping light in the 1.4-μm wavelength band capable of Raman-amplifying the signal light in S band incurs a large loss when propagating through the dispersion-compensating optical fiber, thus exhibiting a low efficiency when Raman-amplifying the signal light, whereby it has been difficult to construct an optical transmission line in which each of the respective absolute values of chromatic dispersion and dispersion slope in the whole optical transmission line is small, while carrying out Raman amplification.

In order to overcome the problem mentioned above, it is an object of the present invention to provide a dispersion-compensating optical fiber and an optical transmission line which are suitable for Raman-amplifying the signal light in S band while lowering the respective absolute values of chromatic dispersion and dispersion slope therein.

SUMMARY OF THE INVENTION

The dispersion-compensating optical fiber in accordance with the present invention exhibits, at a wavelength of 1500 nm, a chromatic dispersion of −30 ps/nm/km or less, a ratio (S/D) of −0.08/nm to +0.05/nm between chromatic dispersion D and dispersion slope S, a polarization mode dispersion of 0.3 ps/km$^{1/2}$ or less, and a transmission loss of 1 dB/km or less; and an excess loss of 0.2 dB/km or less due to OH group in a wavelength band of 1.4 μm. The use of this dispersion-compensating optical fiber compensates for the chromatic dispersion and dispersion slope of the transmission optical fiber in S band, thereby lowering the absolute value of chromatic dispersion in the optical transmission line including the transmission optical fiber and dispersion-compensating optical fiber, thus being suitable for transmitting the signal light in S band. When this dispersion-compensating optical fiber is supplied with Raman amplification pumping light (in the 1.4-μm wavelength band), the latter propagates through the former with a low loss, whereby the signal light in S band propagating through the dispersion-compensating optical fiber is Raman-amplified with a high efficiency.

The dispersion-compensating optical fiber in accordance with the present invention may exhibit a cutoff wavelength of 1.4 μm or shorter. In this case, the dispersion-compensating optical fiber performs a single-mode operation even in the 1.4-μm wavelength band of Raman amplification pumping light capable of pumping the signal light in S band.

The dispersion-compensating optical fiber in accordance with the present invention may be covered with a hermetic coat. In this case, $H_2$ can be prevented from intruding into the dispersion-compensating optical fiber, whereby the dispersion-compensating optical fiber can be restrained from increasing its loss.

The optical transmission line in accordance with one aspect of the present invention comprises a transmission optical fiber exhibiting, at a wavelength of 1500 nm, a chromatic dispersion of +2 ps/nm/km to +8 ps/nm/km and a dispersion slope of 0.055 ps/nm$^2$/km to 0.065 ps/nm$^2$/km; and the dispersion-compensating optical fiber in accordance with the present invention, connected to the transmission optical fiber, having a length yielding a slope compensation ratio of 50% to 150% with respect to the transmission optical fiber. The optical transmission line in accordance with another aspect of the present invention comprises a transmission optical fiber exhibiting, at a wavelength of 1500 nm, a chromatic dispersion of −3 ps/nm/km to +2 ps/nm/km and a dispersion slope of 0.085 ps/nm$^2$/km to 0.095 ps/nm$^2$/km;

and the dispersion-compensating optical fiber in accordance with the present invention, connected to the transmission optical fiber, having a length yielding a slope compensation ratio of 50% to 150% with respect to the transmission optical fiber. The optical transmission line in accordance with still another aspect of the present invention comprises a transmission optical fiber exhibiting, at a wavelength of 1500 nm, a chromatic dispersion of −1 ps/nm/km to +5 ps/nm/km and a dispersion slope of 0.040 ps/nm²/km to 0.050 ps/nm²/km; and the dispersion-compensating optical fiber in accordance with the present invention, connected to the transmission optical fiber, having a length yielding a slope compensation ratio of 50% to 150% with respect to the transmission optical fiber.

The optical transmission line in accordance with still more another aspect of the present invention comprises a transmission optical fiber exhibiting, at a wavelength of 1500 nm, a positive chromatic dispersion, and the dispersion-compensating optical fiber in accordance with the present invention, connected to the transmission optical fiber, having a length yielding a slope compensation ratio of 50% to 150% with respect to the transmission optical fiber The optical transmission line in accordance with still further another aspect of the present invention comprises a transmission optical fiber exhibiting, at a wavelength of 1500 nm, a positive chromatic dispersion and less than +10 ps/km/nm, and the dispersion-compensating optical fiber in accordance with the present invention, connected to the transmission optical fiber, having a length yielding a slope compensation ratio of 50% to 150% with respect to the transmission optical fiber.

In these optical transmission lines, in S band, the dispersion-compensating optical fiber compensates for the chromatic dispersion and dispersion slope of the transmission optical fiber, so as to lower the absolute value of chromatic dispersion of the optical transmission line including the transmission optical fiber and dispersion-compensating optical fiber, thus being suitable for transmitting the signal light in S band. When such an optical transmission line is supplied with Raman amplification pumping light (in the 1.4-$\mu$m wavelength band), the latter propagates through a wide region of the optical transmission line since the dispersion-compensating optical fiber exhibits a low loss in the Raman amplification optical transmission line, whereby the signal light in S band propagating through the optical transmission line is Raman-amplified with a high efficiency.

The optical transmission line in accordance with the present invention may further comprise Raman amplification pumping light supplying means for supplying the optical transmission line with Raman amplification pumping light for Raman-amplifying signal light in S band propagating through the optical transmission line. In this case, the Raman amplification pumping light supplying means supplies the optical transmission line with the Raman amplification pumping light (in the 1.4-$\mu$m wavelength band), whereby the signal light in S band propagating through the optical transmission line is Raman-amplified.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIGS. 11A–11N are views for explaining other refractive index profiles of the dispersion-compensating optical fiber 21 in accordance with the embodiment.

DETAILED DESCRIPTION OF THE PREFERRED EMBODIMENTS

In the following, embodiments of the present invention will be explained in detail with reference to the accompanying drawings. In the explanation of the drawings, constituents identical to each other will be referred to with numerals identical to each other without repeating their overlapping descriptions.

Figure 1:
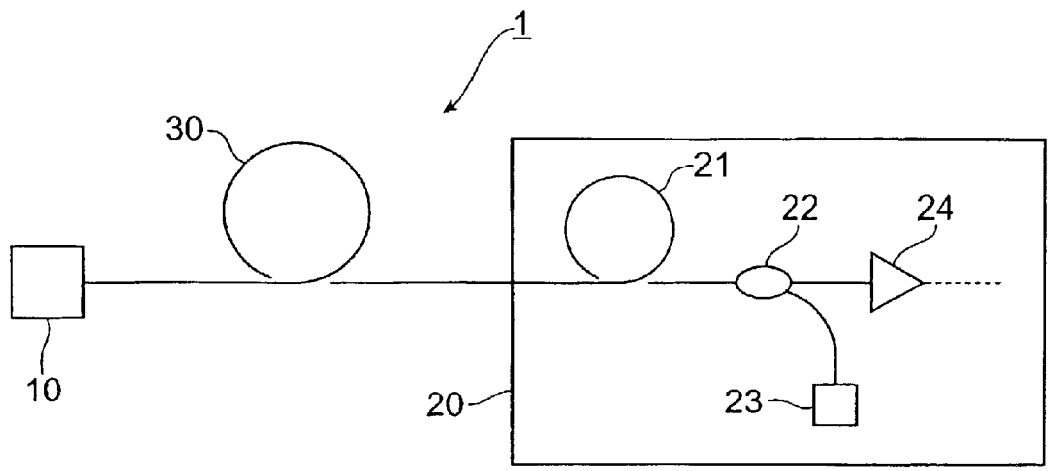
FIG. 1 shows a schematic diagram showing the optical transmission system 1 including the dispersion-compensating optical fiber 21 in accordance with an embodiment and an optical transmission line.

FIG. 1 is a schematic diagram of an optical transmission system 1 including a dispersion-compensating optical fiber 21 in accordance with an embodiment of the present invention and an optical transmission line. This optical transmission system 1 comprises repeaters 10, 20, and a transmission optical fiber 30 laid therebetween, whereas the dispersion-compensating optical fiber 21, an optical coupler 22, a Raman amplification pumping light source 23, and an EDFA 24 are disposed with in the repeater 20. The transmission optical fiber 30 and the dispersion-compensating optical fiber 21 constitute the optical transmission line in accordance with this embodiment. In this optical transmission system 1, signal light included in one of S, C, and L bands is transmitted from the repeater 10 to the repeater 20 by way of the transmission optical fiber 30.

The dispersion-compensating optical fiber 21 compensates for the chromatic dispersion of the transmission optical fiber 30 and the dispersion slope thereof. The optical coupler 22 outputs to the EDFA 24 the signal light having arrived from the dispersion-compensating optical fiber 21, and outputs to the dispersion-compensating optical fiber 21 the Raman amplification pumping light having arrived from the Raman amplification pumping light source 23. The Raman amplification pumping light source 23 outputs Raman amplification pumping light having a wavelength (1.4 $\mu$m) capable of Raman-amplifying signal light in S band in the signal light propagating through the transmission optical fiber 30 and dispersion-compensating optical fiber 21. The EDFA 24 optically amplifies signal light included in one of C and L bands in the signal light having arrived from the optical coupler 22, and outputs thus amplified signal light together with the signal light in S band.

In this optical transmission system 1, signal light in one of S, C, and L bands outputted from the repeater 10 reaches the repeater 20 by way of the transmission optical fiber 30. The signal light in C or L band in the signal light having reached the repeater 20 propagates through the dispersion-compensating optical fiber 21 within the repeater 20, and passes through the optical coupler 22, so as to be optically amplified by the EDFA 24. The signal light in S band, while propagating through the transmission optical fiber 30 and the dispersion-compensating optical fiber 21, is Raman-amplified by the Raman amplification pumping light passing through the optical coupler 22 so as to propagate from the dispersion-compensating optical fiber 21 to the transmission optical fiber 30, and then passes through the optical coupler 22, and through the EDFA 24 without being optically amplified.

Thus, in the optical transmission system 1, the signal light in C or L band is optically amplified by the EDFA 24, whereas the signal light in S band is Raman-amplified in the dispersion-compensating optical fiber 21. The dispersion-compensating optical fiber 21 compensates for the chromatic dispersion and dispersion slope of the transmission optical fiber 30. Therefore, the optical transmission system 1 is capable of long-distance/large-capacity optical transmissions by using a wide signal light wavelength band including S, C, and L bands.

For example, the transmission optical fiber 30 is a nonzero dispersion-shifted optical fiber exhibiting a positive chromatic dispersion of several ps/nm/km at a wavelength of 1500 nm. For example, it exhibits, at a wavelength of 1500 nm, a chromatic dispersion of +2 ps/nm/km to +8 ps/nm/km and a dispersion slope of 0.055 ps/nm$^2$/km to 0.065 ps/nm$^2$/km. In another example, it exhibits, at a wavelength of 1500 nm, a chromatic dispersion of −3 ps/nm/km to +2 ps/nm/km and a dispersion slope of 0.085 ps/nm$^2$/km to 0.095 ps/nm$^2$/km. In still another example, it exhibits, at a wavelength of 1500 nm, a chromatic dispersion of −1 ps/nm/km to +5 ps/nm/km and a dispersion slope of 0.040 ps/nm$^2$/km to 0.050 ps/nm$^2$/km. In more another example, it exhibits, at a wavelength of 1500 nm, a positive chromatic dispersion. In more another example, it exhibits, at a wavelength of 1500 nm, a positive chromatic dispersion and less than +10 ps/km/nm.

On the other hand, the dispersion-compensating optical fiber 21 in accordance with this embodiment exhibits, at a wavelength of 1500 nm, a chromatic dispersion $D_{DCF}$ Of −30 ps/nm/km or less, a ratio ($S_{DCF}/D_{DCF}$) of −0.08/nm to +0.05/nm between chromatic dispersion $D_{DCF}$ and dispersion slope $S_{DCF}$, a polarization mode dispersion of 0.3 ps/km$^{1/2}$ or less, and a transmission loss of 1 dB/km or less; and an excess loss of 0.2 dB/km or less caused by OH group in the 1.4-$\mu$m wavelength band. Also, this dispersion-compensating optical fiber 21 has a cutoff wavelength of 1.4 $\mu$m or shorter. "Cable cut-off wavelength $\lambda$c is defined in ITU-T Recommendation G. 650. ITU-T Recommendation G. 650 is hereby incorporated by reference. Such a dispersion-compensating optical fiber 21 will be explained in detail in the following.

Figure 2:
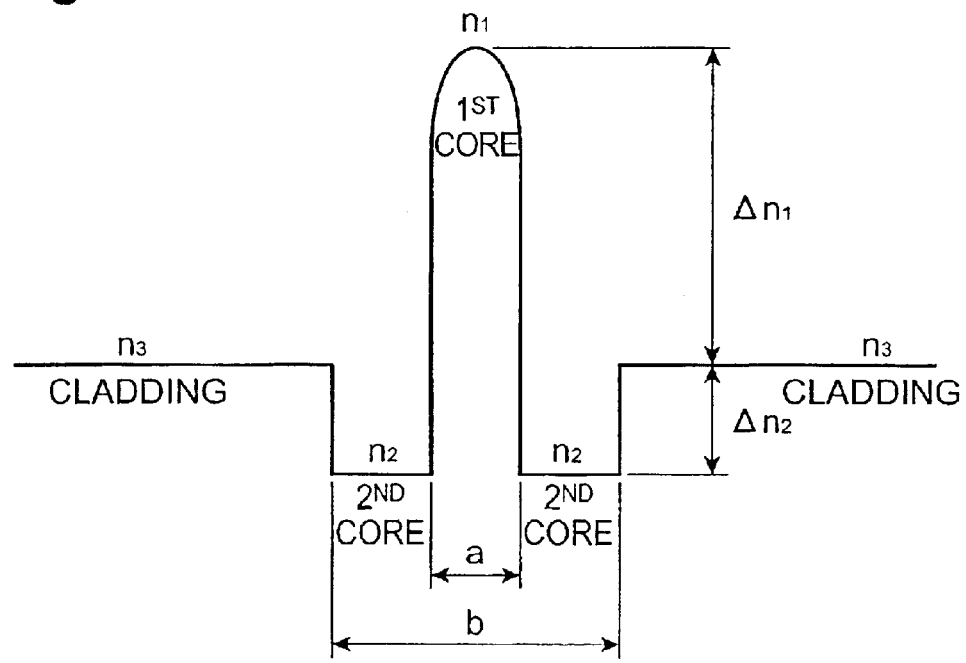
FIG. 2 is a view for explaining the refractive index profile of the dispersion-compensating optical fiber 21 in accordance with the embodiment.

FIG. 2 is a view for explaining the refractive index profile of the dispersion-compensating optical fiber 21 in accordance with this embodiment. This dispersion-compensating optical fiber has a first core region including the optical axis center and having an outer diameter a and a maximum refractive index $n_1$, a second core region surrounding the first core region and having an outer diameter b and a refractive index $n_2$, and a cladding region surrounding the second core region and having a refractive index $n_3$. The respective refractive indices of the individual regions have the relationship of $n_1 > n_3 > n_2$ in terms of magnitude. In this drawing, $\Delta n_1$ represents the relative refractive index difference of the first core region with respect to the cladding region, whereas $\Delta n_2$ represents the relative refractive index difference of the second core region with respect to the cladding region.

While the dispersion-compensating optical fiber 21 is based on silica glass, the first core region is doped with GeO$_2$, whereas the second core region is doped with F element. In the optical fiber preform for making the dispersion-compensating optical fiber 21, the first core region is manufactured by VAD (vapor-phase axial deposition), whereas the second core region and cladding region are manufactured by rod-in-collapse and VAD or OVD (outside vapor deposition). Alternatively, in the optical fiber preform for making the dispersion-compensating optical fiber 21, the first core region is manufactured by MCVD (modified chemical vapor deposition), whereas the second core region and cladding region are manufactured by VAD.

Dehydrating the optical fiber preform at the time of manufacture can lower the OH group content in the first core region of the dispersion-compensating optical fiber 21, whereby the dispersion-compensating optical fiber 21 can yield an excess loss of 0.2 dB/km or less due to OH group in the 1.4-$\mu$m wavelength band. However, glass defects are likely to occur in the first core region of the dispersion-compensating optical fiber 21 if OH group is eliminated, whereby loss increases if the dispersion-compensating optical fiber 21 is exposed to an H$_2$ environment. Therefore, it is preferred that the dispersion-compensating optical fiber 21 in accordance with this embodiment be covered with a hermetic coat. This can prevent H$_2$ from intruding into the dispersion-compensating optical fiber 21, whereby the dispersion-compensating optical fiber 21 can be restrained from increasing its loss. As a consequence, signal light in S band is stably Raman-amplified in the dispersion-compensating optical fiber 21.

In order to prevent the generation of OH absorber for absorbing light at 1.4 μm wavelength band, it is effective to expose the fiber having a core in which defects are generated against the atmosphere of D2 (deuterium) to cause the defects to be terminate by the D2 also.

Preferably, in the drawing process of making the dispersion-compensating optical fiber 21 by drawing the optical fiber preform, drawing with swinging is carried out. In the drawing with swinging, rollers by way of which the drawn dispersion-compensating optical fiber 21 reaches a take-up bobbin are swung. This swinging alleviates the anisotropy of stress distribution in the dispersion-compensating optical fiber 21, whereby the polarization mode dispersion of the dispersion-compensating optical fiber 21 is reduced to 0.3 ps/km$^{1/2}$ or less.

Each of FIGS. 3 to 8 is a graph showing relationships between chromatic dispersion and slope compensation ratio in the dispersion-compensating optical fiber 21 in accordance with this embodiment at a wavelength of 1500 nm. Here, the slope compensation ratio η of the dispersion-compensating optical fiber 21 is represented by the following expression:

$$\eta = (D/S)/(D_{DCF}/S_{DCF})$$

wherein $D_{DCF}$ is the chromatic dispersion of the dispersion-compensating optical fiber 21, $S_{DCF}$ is the dispersion slope of the dispersion-compensating optical fiber 21, D is the chromatic dispersion of the transmission optical fiber 30, and S is the dispersion slope of the transmission optical fiber 30. At a wavelength of 1500 nm, the chromatic dispersion D of the transmission optical fiber 30 is +5 ps/nm/km, whereas its dispersion slope S is 0.06 ps/nm²/km. Each of FIGS. 3 to 8 indicates the relationship between chromatic dispersion $D_{DCF}$ and slope compensation ratio η at each of various values of the ratio Ra=a/b between the outer diameter a of the first core region and the outer diameter b of the second core region.

Figure 3:
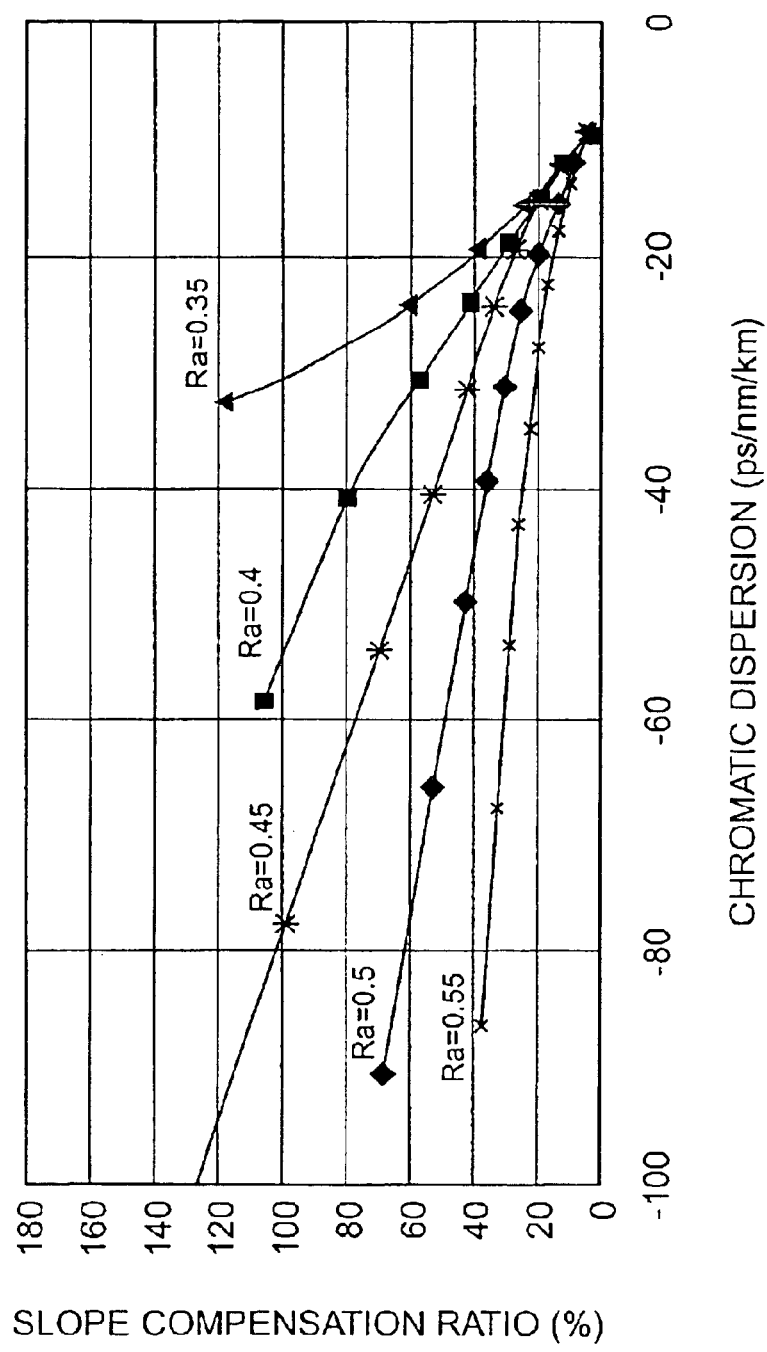
FIG. 3 shows a graph showing relationships between chromatic dispersion and slope compensation ratio of the dispersion-compensating optical fiber 21 at a wavelength of 1500 nm.
Figure 4:
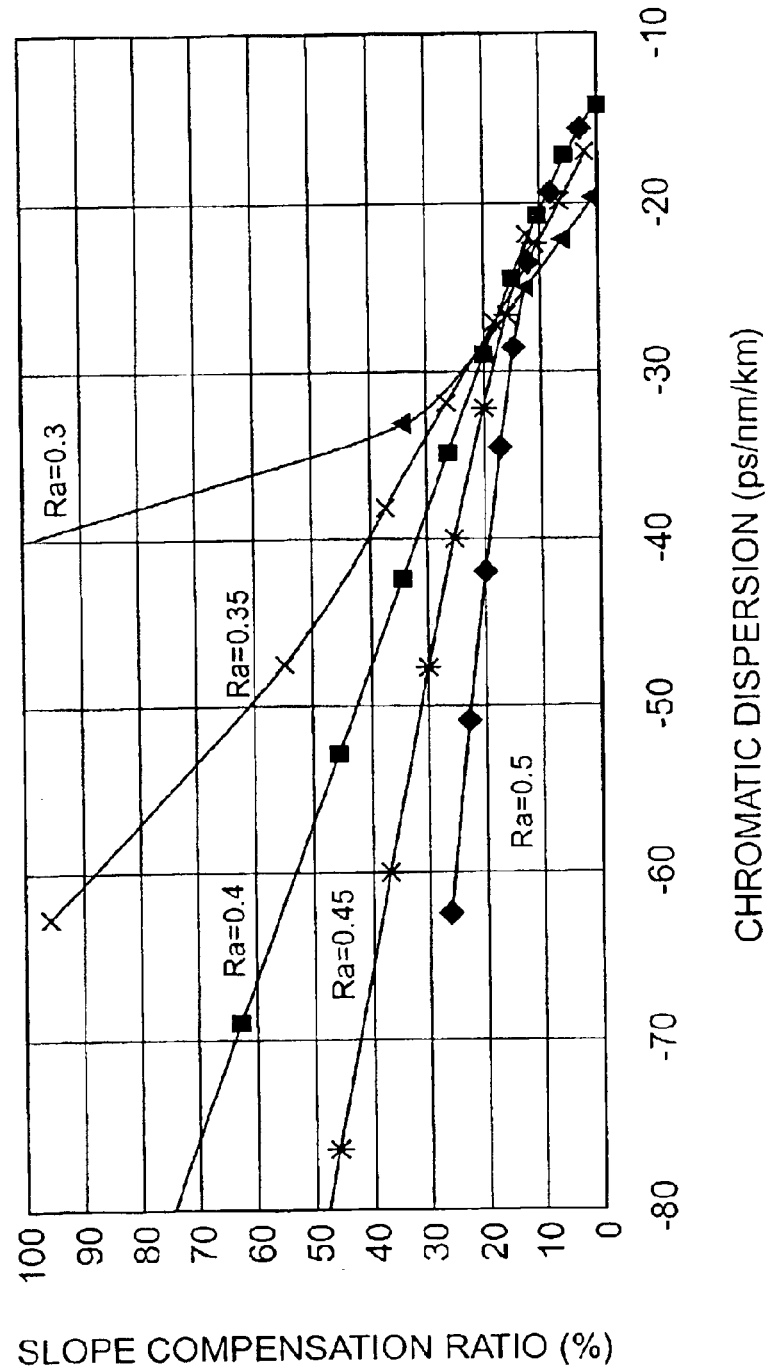
FIG. 4 shows a graph showing relationships between chromatic dispersion and slope compensation ratio of the dispersion-compensating optical fiber 21 at a wavelength of 1500 nm.
Figure 5:
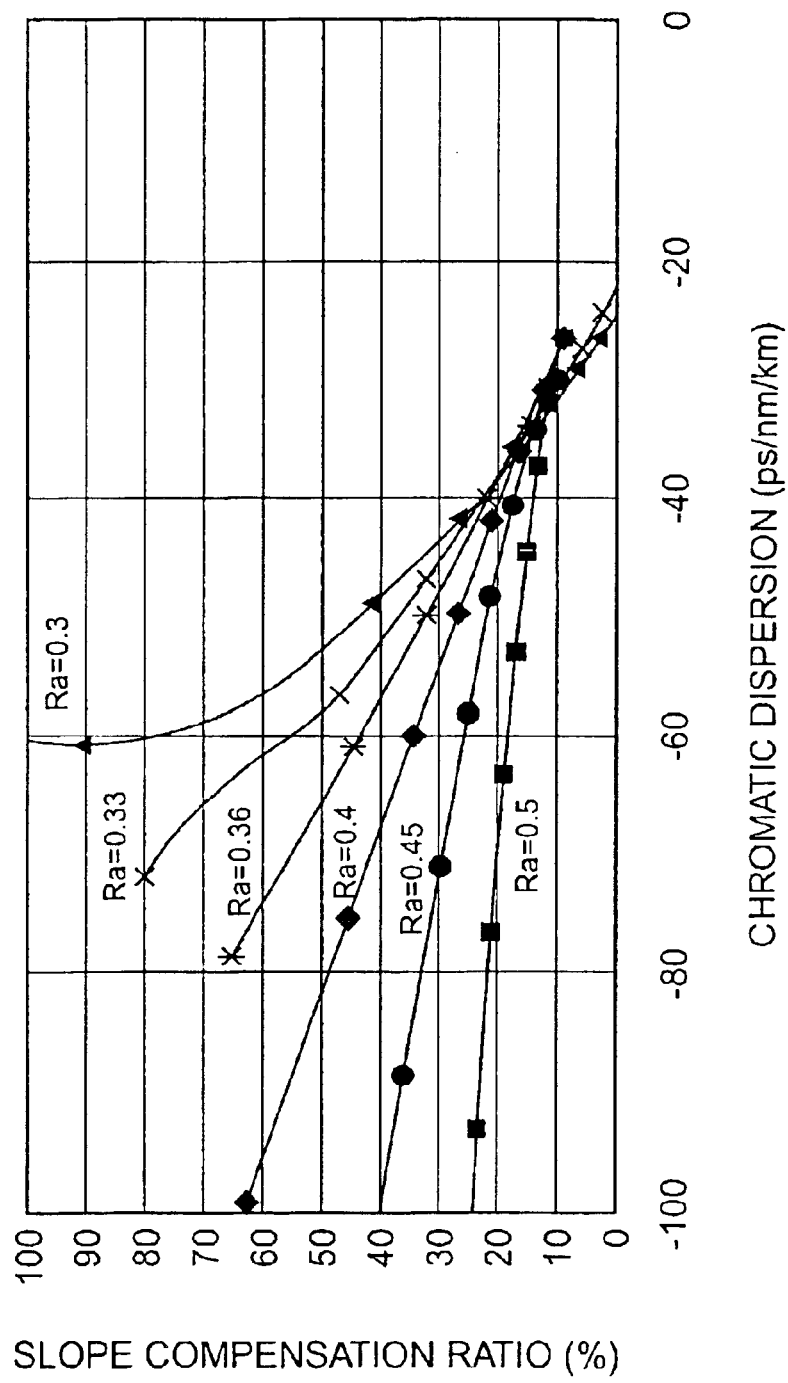
FIG. 5 shows a graph showing relationships between chromatic dispersion and slope compensation ratio of the dispersion-compensating optical fiber 21 at a wavelength of 1500 nm.
Figure 6:
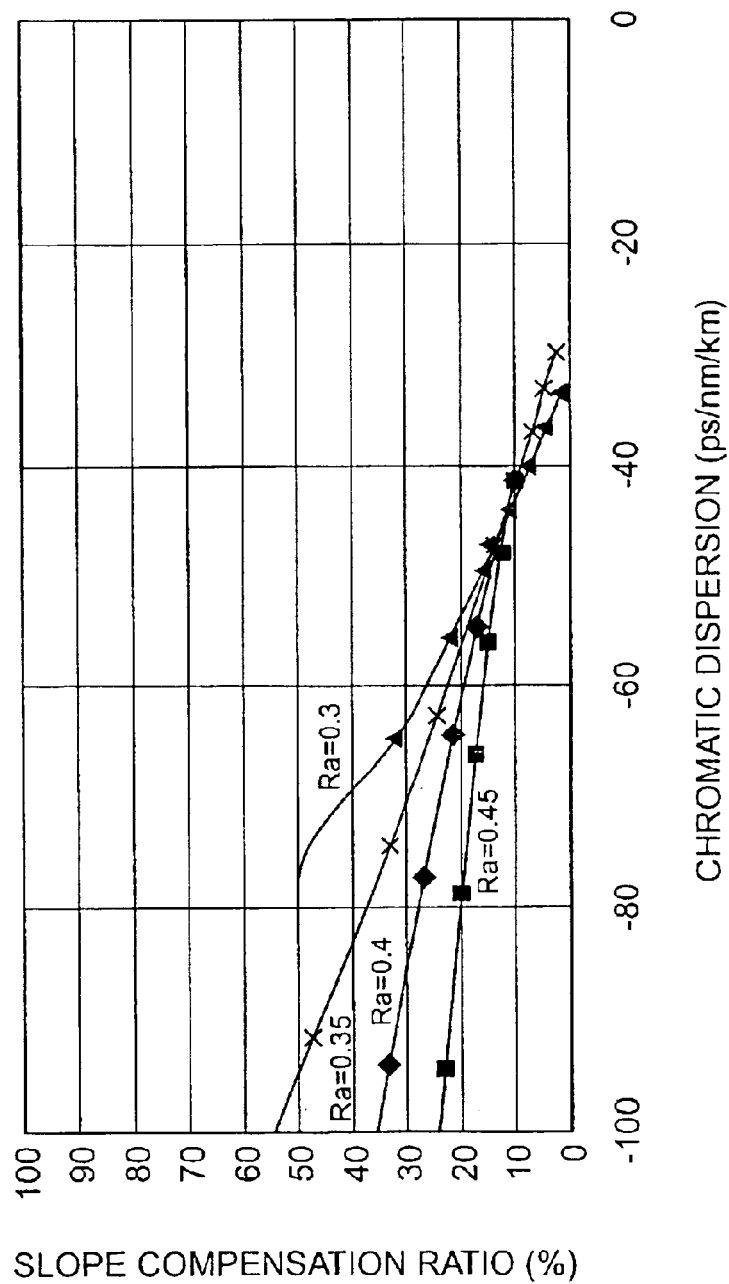
FIG. 6 shows a graph showing relationships between chromatic dispersion and slope compensation ratio of the dispersion-compensating optical fiber 21 at a wavelength of 1500 nm.
Figure 7:
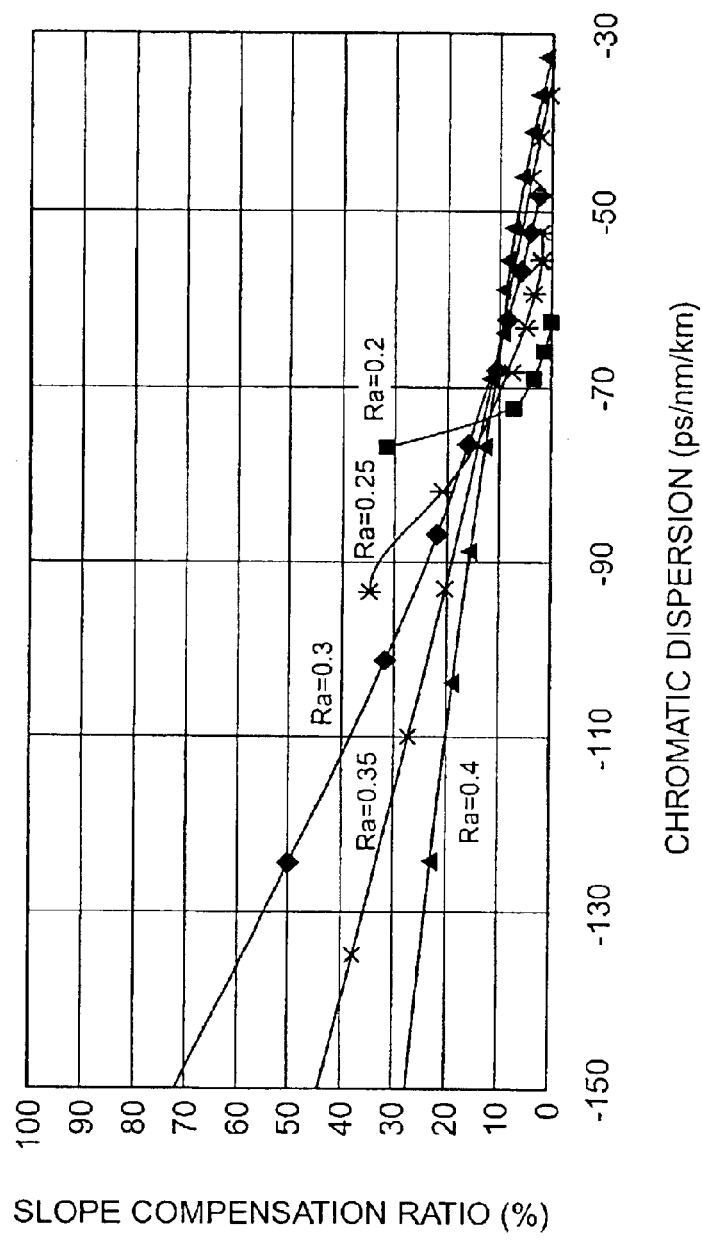
FIG. 7 shows a graph showing relationships between chromatic dispersion and slope compensation ratio of the dispersion-compensating optical fiber 21 at a wavelength of 1500 nm.
Figure 8:
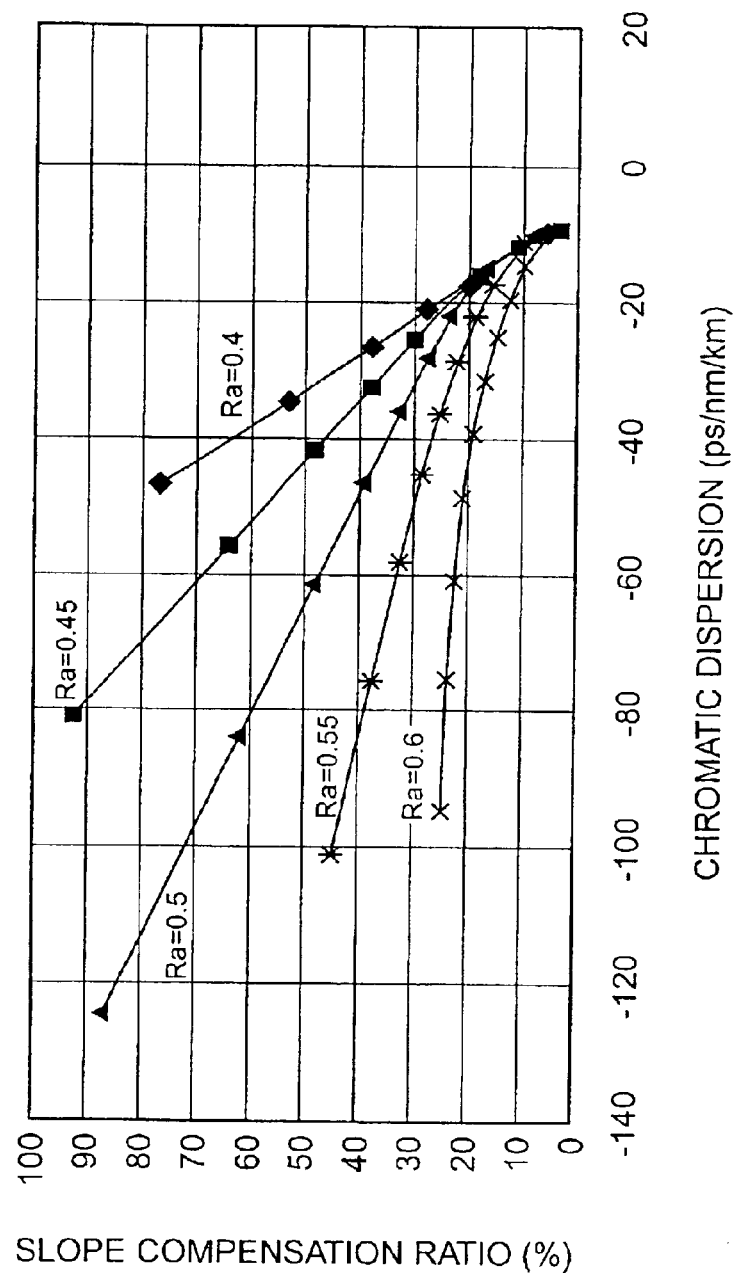
FIG. 8 shows a graph showing relationships between chromatic dispersion and slope compensation ratio of the dispersion-compensating optical fiber 21 at a wavelength of 1500 nm.

In FIG. 3, the relative refractive index difference $\Delta n_1$ is +1.2%, whereas the relative refractive index difference $\Delta n_2$ is −0.5%. In FIG. 4, the relative refractive index difference $\Delta n_1$ is +1.5%, whereas the relative refractive index difference $\Delta n_2$ is −0.5%. In FIG. 5, the relative refractive index difference $\Delta n_1$ is +1.7%, whereas the relative refractive index difference $\Delta n_2$ is −0.5%. In FIG. 6, the relative refractive index difference $\Delta n_1$ is +2.0%, whereas the relative refractive index difference $\Delta n_2$ is −0.5%. In FIG. 7, the relative refractive index difference $\Delta n_1$ is +2.5%, whereas the relative refractive index difference $\Delta n_2$ is −0.5%. In FIG. 8, the relative refractive index difference $\Delta n_1$ is +1.5%, whereas the relative refractive index difference $\Delta n_2$ is −0.7%.

As can be seen from these graphs, when values of the respective relative refractive index differences of the first and second core regions and the ratio Ra are appropriately designed, the dispersion-compensating optical fiber 21 can attain desirable values of chromatic dispersion $D_{DCF}$ and the slope compensation ratio for the transmission optical fiber 30 whose dispersion is to be compensated for, thus being able to attain, at a wavelength of 1500 nm, a chromatic dispersion $D_{DCF}$ of −30 ps/nm/km or less, a ratio ($S_{DCF}/D_{DCF}$) of −0.08/nm to +0.05/nm, and a slope compensation ratio of 50% to 150%. Also, the cutoff wavelength can be made 1.4 μm or shorter, whereby the dispersion-compensating optical fiber 21 can perform a single-mode operation in the 1.4-μm wavelength band of Raman amplification pumping light as well.

Figure 9:
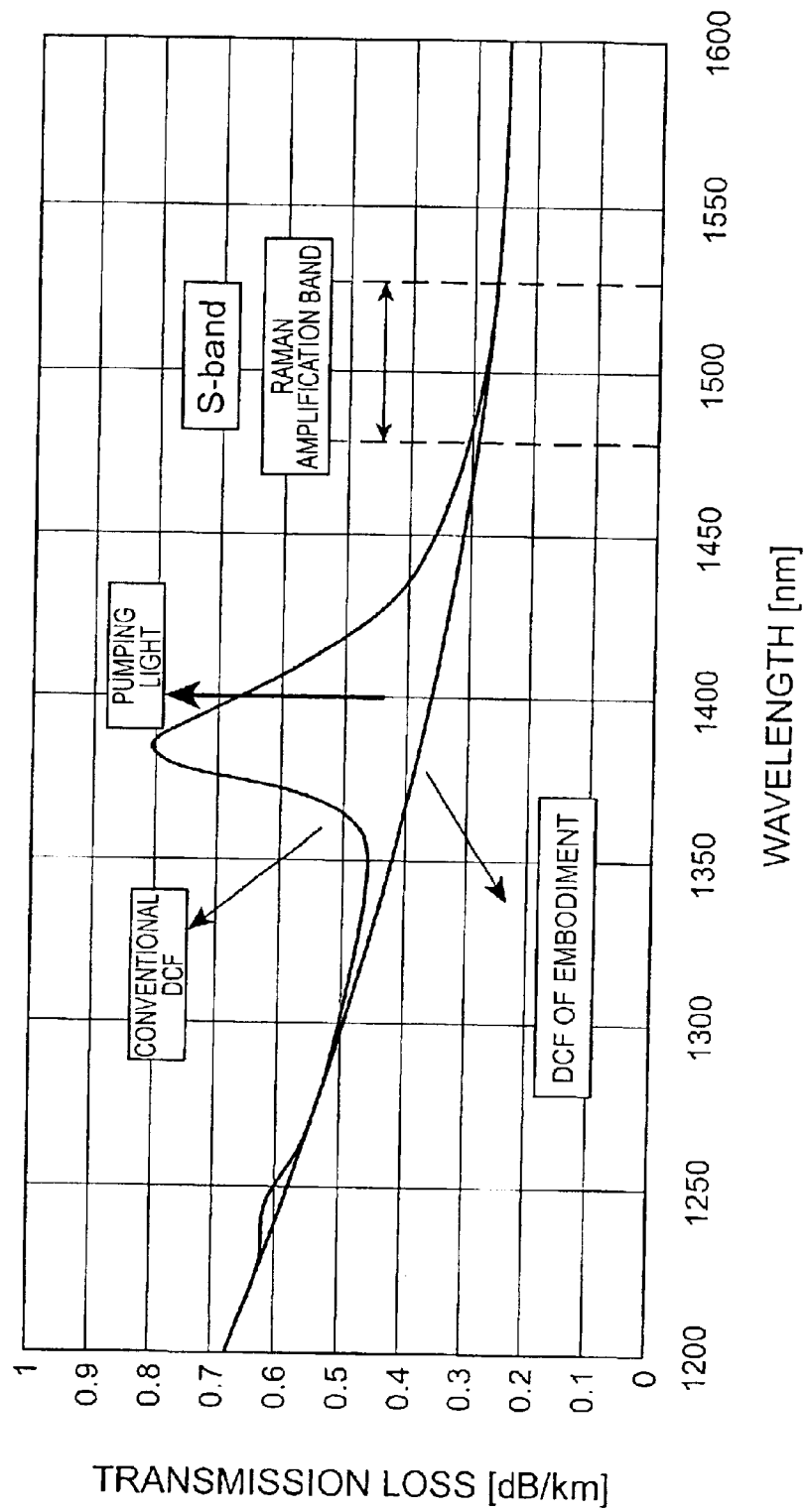
FIG. 9 shows a graph showing the wavelength dependence of transmission loss in the dispersion-compensating optical fiber 21 in accordance with the embodiment.

FIG. 9 is a graph showing the wavelength dependence of transmission loss in the dispersion-compensating optical fiber 21 in accordance with this embodiment. This graph also shows the wavelength dependence of transmission loss in a conventional dispersion-compensating optical fiber, and the range of S band, i.e., Raman amplification band, whereas the upper arrows therein indicate the positions of Raman amplification pumping light wavelengths which can Raman-amplify the signal light in S band. Though the conventional dispersion-compensating optical fiber shown in this graph yields an excess loss of about 0.4 dB/km due to OH group in the 1.4-μm wavelength band, the excess loss due to OH group in the 1.4-μm wavelength band in the dispersion-compensating optical fiber 21 in accordance with this embodiment is so small that it is substantially negligible. Also, the transmission loss at a wavelength of 1500 nm is about 0.3 dB/km and less than 1 dB/km in the dispersion-compensating optical fiber 21 in accordance with this embodiment.

Figure 10:
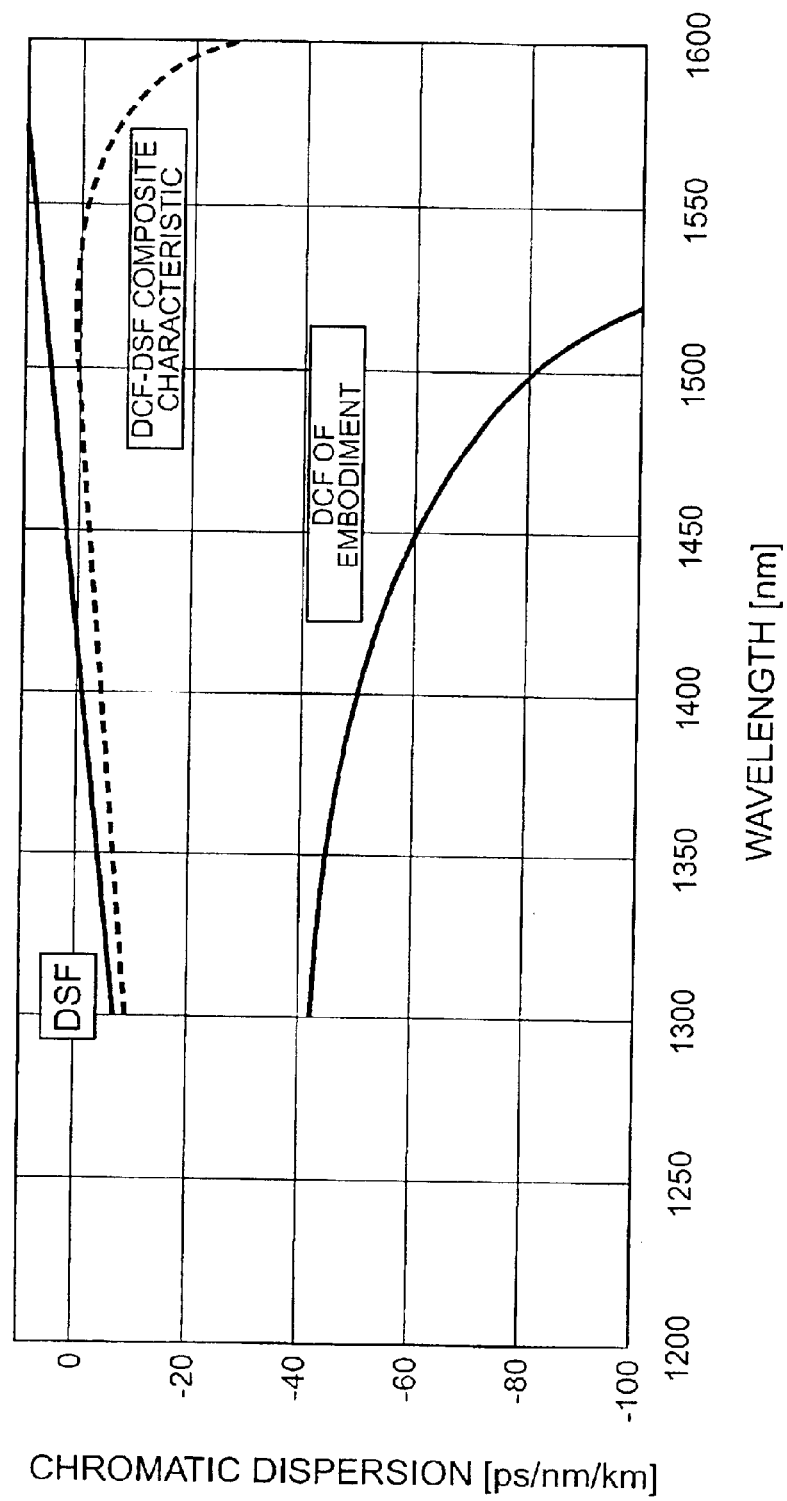
FIG. 10 shows a graph showing the chromatic dispersion characteristic of the dispersion-compensating optical fiber 21 in accordance with the embodiment, the chromatic dispersion characteristic of the transmission optical fiber 30, and the chromatic dispersion characteristic of the whole optical transmission line including the dispersion-compensating optical fiber 21 and transmission optical fiber 30.

FIG. 10 is a graph showing the chromatic dispersion characteristic of the dispersion-compensating optical fiber 21 in accordance with this embodiment, the chromatic dispersion characteristic of the transmission optical fiber 30, and the chromatic dispersion characteristic of the whole optical transmission line including the dispersion-compensating optical fiber 21 and transmission optical fiber 30. The length ratio between the dispersion-compensating optical fiber 21 and transmission optical fiber 30 was adjusted such that the chromatic dispersion of the whole optical transmission line became zero at a wavelength of 1500 nm. As can be seen from this graph, the chromatic dispersion and dispersion slope of the transmission optical fiber 30 are compensated for by the dispersion-compensating optical fiber 21, whereby the absolute value of chromatic dispersion is small throughout the wide wavelength range of S band in the whole optical transmission line including the dispersion-compensating optical fiber 21 and transmission optical fiber 30.

When the dispersion-compensating optical fiber 21 in accordance with this embodiment and the optical transmission line are used as in the foregoing, the Raman amplification pumping light outputted from the Raman amplification pumping light source 23 propagates through the dispersion-compensating optical fiber 21 with a low loss, thus propagating from the dispersion-compensating optical fiber 21 to the transmission optical fiber 30, so as to be supplied over a wide area of the optical transmission line. Therefore, the signal light in S band propagating through the optical transmission line is Raman-amplified with a high efficiency. Also, the optical transmission line including the transmission optical fiber 30 and dispersion-compensating optical fiber 21 is excellent in the transmission quality of signal light in S band, since its absolute value of chromatic dispersion is small throughout the whole wavelength range of S band.

Without being restricted to the above-mentioned embodiment, the present invention can be modified in various manners. For example, the refractive index profile of the dispersion-compensating optical fiber 21 is not limited to that shown in Fig. 2, but may be other refractive index profiles shown in FIGS. 11A–11N. The refractive index profile shown in FIG. 11A is similar to that shown in FIG. 2. Each of the respective refractive index profiles shown in FIGS. 11A to 11N has a core portion 110 and a cladding region 120, whereas the form of core portion 110 varies. The optical fiber preforms for making the dispersion-compensating optical fibers having the respective refractive index profiles shown in FIGS. 11A to 11I and 11N can be made by the methods already explained. In each of the optical fiber preforms for making the dispersion-compensating optical fibers having the respective refractive index profiles shown in FIGS. 11J to 11M (in which the center core region including the optical axis center in the core portion 110 has a refractive index lower than that in the surrounding region), the center core region is manufactured by VAD, whereas the other regions are manufactured by rod-in-collapse and VAD or OVD. Alternatively, the center core region is manufactured by MCVD, whereas the other regions are manufactured by VAD.

As explained in detail in the foregoing, the dispersion-compensating optical fiber in accordance with the present invention exhibits, at a wavelength of 1500 nm, a chromatic dispersion of −30 ps/nm/km or less, a ratio (S/D) of −0.08/nm to +0.05/nm between chromatic dispersion D and dispersion slope S, a polarization mode dispersion of 0.3 ps/km$^{1/2}$ or less, and a transmission loss of 1 dB/km or less; and an excess loss of 0.2 dB/km or less due to OH group in the 1.4-$\mu$m wavelength band. The use of this dispersion-compensating optical fiber compensates for the chromatic dispersion and dispersion slope of the transmission optical fiber in S band, thereby lowering the absolute value of chromatic dispersion in the optical transmission line including the transmission optical fiber and dispersion-compensating optical fiber, thus being suitable for transmitting the signal light in S band. When this dispersion-compensating optical fiber is supplied with Raman amplification pumping light (in the 1.4-$\mu$m wavelength band), the latter propagates through the former with a low loss, whereby the signal light in S band propagating through the dispersion-compensating optical fiber is Raman-amplified with a high efficiency.

When the cutoff wavelength is 1.4 $\mu$m or shorter, the dispersion-compensating optical fiber in accordance with the present invention performs a single-mode operation even in the 1.4-$\mu$m wavelength band of Raman amplification pumping light capable of pumping the signal light in S band.

When covered with a hermetic coat, the dispersion-compensating optical fiber in accordance with the present invention can prevent H$_2$ from intruding therein, thus being able to restrain loss from increasing.

The optical transmission line in accordance with the present invention comprises a transmission optical fiber and the above-mentioned dispersion-compensating optical fiber in accordance with the present invention connected to each other. In this optical transmission line, the dispersion-compensating optical fiber compensates for the chromatic dispersion and dispersion slope of the transmission optical fiber in S band, thereby lowering the absolute value of chromatic dispersion in the optical transmission line including the transmission optical fiber and dispersion-compensating optical fiber, which is suitable for transmitting the signal light in S band. When this dispersion-compensating optical fiber is supplied with Raman amplification pumping light (in the 1.4-$\mu$m wavelength band), the latter propagates through the former with a low loss, thus propagating throughout a wide area of the optical transmission line including the transmission optical fiber and dispersion-compensating optical fiber, whereby the signal light in S band propagating through the optical transmission line is Raman-amplified with a high efficiency.

The optical transmission line in accordance with the present invention may further comprise Raman amplification pumping light supplying means for supplying the optical transmission line with Raman amplification pumping light for Raman-amplifying signal light propagating through the optical transmission line. In this case, the Raman amplification pumping light supplying means supplies the optical transmission line with the Raman amplification pumping light (in the 1.4-$\mu$m wavelength band), whereby the signal light in S band propagating through the optical transmission line is Raman-amplified.

The Japanese Application No. 245,747/2000 filed on Aug. 14, 2000 is hereby incorporated by reference. From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A dispersion-compensating optical fiber exhibiting, at a wavelength of 1500 nm, a chromatic dispersion of −30 ps/nm/km or less, a ratio (S/D) of −0.08/nm to +0.05/nm between chromatic dispersion D and dispersion slope S, a polarization mode dispersion of 0.3 ps/km$^{1/2}$ or less, and a transmission loss of 1 dB/km or less; and an excess loss of 0.2 dB/km or less due to OH group in a wavelength band of 1.4 $\mu$m.

2. A dispersion-compensating optical fiber according to claim 1, exhibiting a cutoff wavelength of 1.4 $\mu$m or shorter.

3. A dispersion-compensating optical fiber according to claim 1, wherein said optical fiber is covered with a hermetic coat.

4. An optical transmission line comprising:

a transmission optical fiber exhibiting, at a wavelength of 1500 nm, a chromatic dispersion of +2 ps/nm/km to +8 ps/nm/km and a dispersion slope of 0.055 ps/nm$^2$/km to 0.065 ps/nm$^2$/km; and the dispersion-compensating optical fiber according to claim 1, connected to said transmission optical fiber, having a length yielding a slope compensation ratio of 50% to 150% with respect to said transmission optical fiber.

5. An optical transmission line comprising:

a transmission optical fiber exhibiting, at a wavelength of 1500 nm, a chromatic dispersion of −3 ps/nm/km to +2 ps/nm/km and a dispersion slope of 0.085 ps/nm$^2$/km to 0.095 ps/nm$^2$/km; and the dispersion-compensating optical fiber according to claim 1, connected to said transmission optical fiber, having a length yielding a slope compensation ratio of 50% to 150% with respect to said transmission optical fiber.

6. An optical transmission line comprising:

a transmission optical fiber exhibiting, at a wavelength of 1500 nm, a chromatic dispersion of −1 ps/nm/km to +5 ps/nm/km and a dispersion slope of 0.040 ps/nm$^2$/km to 0.050 ps/nm$^2$/km; and the dispersion-compensating optical fiber according to claim 1, connected to said transmission optical fiber, having a length yielding a slope compensation ratio of 50% to 150% with respect to said transmission optical fiber.

7. An optical transmission line according to claim 4, further comprising Raman amplification pumping light supplying means for supplying Raman amplification pumping light for Raman-amplifying signal light.

8. An optical transmission line according to claim 5, further comprising Raman amplification pumping light supplying means for supplying Raman amplification pumping light for Raman-amplifying signal light.

9. An optical transmission line according to claim 6, further comprising Raman amplification pumping light supplying means for supplying Raman amplification pumping light for Raman-amplifying signal light.

10. An optical transmission line comprising:
a transmission optical fiber exhibiting, at a wavelength of 1500 nm, a positive chromatic dispersion; and
the dispersion-compensating optical fiber according to claim 1, connected to said transmission optical fiber, having a length yielding a slope compensation ratio of 50% to 150% with respect to said transmission optical fiber.

11. An optical transmission line comprising;:
a transmission optical fiber exhibiting, at a wavelength of 1500 nm, a positive chromatic dispersion and less than +10 ps/km/nm; and
the dispersion-compensating optical fiber according to claim 1, connected to said transmission optical fiber, having a length yielding a slope compensation ratio of 50% to 150% with respect to said transmission optical fiber.

12. A dispersion-compensating optical fiber according to claim 1, exhibiting a cable cutoff wavelength of 1.4 $\mu$m or shorter.

* * * * *